(12) United States Patent
Goodger et al.

(10) Patent No.: US 8,910,070 B2
(45) Date of Patent: Dec. 9, 2014

(54) TAB PAGES AND BOOKMARK TOOLBARS IN A BROWSER

(75) Inventors: Ben Goodger, Los Altos Hills, CA (US); Glen Murphy, Mountain View, CA (US); Brian Rakowski, Palo Alto, CA (US)

(73) Assignee: Google Inc., Mountain View, CA (US)

(*) Notice: Subject to any disclaimer, the term of this patent is extended or adjusted under 35 U.S.C. 154(b) by 500 days.

(21) Appl. No.: 12/551,842

(22) Filed: Sep. 1, 2009

(65) Prior Publication Data
US 2010/0070928 A1    Mar. 18, 2010

Related U.S. Application Data

(60) Provisional application No. 61/093,441, filed on Sep. 1, 2008.

(51) Int. Cl.
*G06F 3/048* (2013.01)
*G06F 17/30* (2006.01)

(52) U.S. Cl.
CPC .... *G06F 17/30905* (2013.01); *G06F 17/30902* (2013.01)
USPC ............ 715/777; 715/764; 715/838; 715/825

(58) Field of Classification Search
CPC ................................................. G06F 17/30902
USPC .................................................. 715/777, 825
See application file for complete search history.

(56) References Cited

U.S. PATENT DOCUMENTS

| 5,917,491 | A  | * | 6/1999  | Bauersfeld ..................... 715/810 |
| 6,718,365 | B1 | * | 4/2004  | Dutta ............................. 709/203 |
| 8,312,383 | B2 | * | 11/2012 | Gilfix ............................ 715/769 |
| 2006/0230356 | A1 | | 10/2006 | Sauve et al. |
| 2006/0244768 | A1 | * | 11/2006 | Witwer ......................... 345/661 |
| 2007/0067733 | A1 | * | 3/2007  | Moore et al. .................. 715/777 |
| 2008/0010252 | A1 | * | 1/2008  | Zamir et al. ..................... 707/3 |
| 2008/0010286 | A1 | * | 1/2008  | Zhang et al. .................... 707/10 |
| 2008/0046840 | A1 | * | 2/2008  | Melton et al. ................. 715/825 |
| 2008/0195674 | A1 | * | 8/2008  | Kim et al. ..................... 707/203 |

(Continued)

FOREIGN PATENT DOCUMENTS

KR    10-2007-0043616 A    4/2007

OTHER PUBLICATIONS

Joyce Cox, Windows Vista Step by Step Deluxe Edition, Publication Date: Feb. 27, 2008, Microsoft Press, pp. 190-207.*

(Continued)

*Primary Examiner* — William Titcomb
(74) *Attorney, Agent, or Firm* — Sterne, Kessler, Goldstein & Fox P.L.L.C.

(57) ABSTRACT

The present invention relates to navigation in a browser, such as a web browser. In a first embodiment, a system creates a new tab in a browser. The system includes a new tab module that generates a new tab page. The new tab page includes navigation options customized to a user. The new tab module sends a signal to display the new tab page to the user in the new tab on the browser. In a second embodiment, a computer-implemented method for displaying a bookmarks toolbar. A user input is received signaling the user's intent to navigate to a new site. A toolbar is displayed with buttons to navigate to bookmarked pages in response to the user input.

19 Claims, 4 Drawing Sheets

(56) References Cited

U.S. PATENT DOCUMENTS

| | | | |
|---|---|---|---|
| 2008/0244398 A1* | 10/2008 | Santos-Gomez et al. | 715/708 |
| 2008/0301562 A1 | 12/2008 | Berger et al. | |
| 2009/0164922 A1* | 6/2009 | Phakousonh et al. | 715/762 |
| 2009/0249179 A1* | 10/2009 | Shieh et al. | 715/206 |
| 2009/0287559 A1* | 11/2009 | Chen et al. | 705/14.23 |
| 2010/0050067 A1* | 2/2010 | Curwen et al. | 715/206 |
| 2010/0180225 A1* | 7/2010 | Chiba et al. | 715/777 |

OTHER PUBLICATIONS http://blog.chron.com/helpline/2007/01/full-screen-mode-in-ie7/, Publication Date Jan. 18, 2007, Jay Lee.*

International Search Report for International Application No. PCT/US2009/055616, The International Bureau of WIPO, Geneva, Switzerland, mailed on Sep. 29, 2011.

International Search Report and Written Opinion for International Application No. PCT/US2009/055616, The International Bureau of WIPO, Geneva, Switzerland, mailed on Aug. 30, 2011.

Windows Vista Step by Step Deluxe Edition, Joyce Cox et al. pp. 190-207, Microsoft Press, Feb. 27, 2008.

"offers assistance in the application of certain features found within Internet Explorer 7", "http://blog.chorn.com/helpline/2007/01/full-screen-mode-in-ie7", Jay, Lee, pp. 1-2.

Office Action issued Sep. 11, 2013, in Chinese Patent Application No. 200980134196.0 with English language translation.

* cited by examiner

TAB PAGES AND BOOKMARK TOOLBARS IN A BROWSER

This application claims the benefit of U.S. Provisional Appl. No. 61/093,441, filed Sep. 1, 2008 incorporated by reference herein in its entirety.

BACKGROUND

1. Field of the Invention

The present invention generally relates browsers.

2. Related Art

A browser is an application that retrieves content and enables a user to interact with that content. In an example, a browser may retrieve content across one or more networks, such as the Internet. The INTERNET EXPLORER 6 browser from MICROSOFT is a type of web browser. Other examples of browsers are the SAFARI browser from APPLE, the OPERA browser from OPERA SOFTWARE, and the CAMINO browser available at http://www.caminobrowser.org/.

Many browsers include toolbars. One such toolbar is a bookmarks toolbar. When a user selects a button from a bookmarks toolbar, the user may be directed to a bookmarked page.

Some browsers provide a tabbed interface. The FIREFOX 2 browser, available at http://www.mozilla.com/, is an example of a browser with a tabbed interface. In a tabbed interface, each browser window may have multiple tabs with each tab able to display a page. In a single window, only one page is visible at a time. If a user selects a tab, a page associated with the tab is displayed. Each browser window can contain many tabs, allowing the user to open many pages inside a single window.

When a user opens a new tab, the new tab may be blank. To navigate to a page, the user may have to, for example, type an address of the page in the address bar. Typing in an address may be time consuming for a user. Instead, the user may select a button on a bookmarks toolbar to navigate to the page. However, having the bookmarks toolbar always open takes up valuable screen space.

Methods and systems are need that improve navigation in a browser.

BRIEF SUMMARY

The present invention relates to navigation in a browser, such as a web browser. In a first embodiment, a method creates a new tab in a browser on a computing device. A new tab page is generated on the computing device. The new tab page includes navigation options customized to a user. The new tab page is displayed to the user in the new tab on the browser.

In a second embodiment, a system creates a new tab in a browser. The system includes a new tab module that generates a new tab page. The new tab page includes navigation options customized to a user. The new tab module sends a signal to display the new tab page to the user in the new tab on the browser.

In a third embodiment, a method displays a bookmarks toolbar on a computing device. A user input is received signaling the user's intent to navigate to a new site on the computing device. A toolbar is displayed with buttons to navigate to bookmarked pages in response to the user input.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION

Embodiments of the present invention help users navigate to the new page in a browser, such as a web browser. Embodiments of the present invention enable a user to navigate to a new page in a browser. In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "page" as used herein refers to content that is displayed together on a single browser content area window. For example, a page may be an HTML document, an Adobe PDF document, a Flash file, or combination thereof For example, an HTML document may include a frame linking to another HTML document. In another illustrative example, an HTML document may include a link to a Flash file that is interpreted by a plug-in.

The term "site" as used herein refers to a set of related pages. For example, the GMAIL email service may be a site. The GMAIL service may have several pages. For example, the GMAIL service may have a login page, an page displaying a user's inbox, a page to change the user's settings and blank pages that display nothing but instruct the browser to redirect to other pages. These examples are merely illustrative and are not meant to limit the present invention.

In an embodiment, a browser system provides a user with personalized options when the user opens a new tab in a web browser. When a user opens a new tab, a web browser may display recently visited sites within the tab. For each recently visited site a thumbnail image illustrating the site may be displayed. When a user selects one of the thumbnails, the user may be navigated to that site.

In another embodiment, a browser system displays a bookmark toolbar when a user indicates his/her intent to navigate to a new page. The bookmarks toolbar may be displayed when a user, for example, opens a new tab. This and other embodiments are described in detail below.

Figure 1:
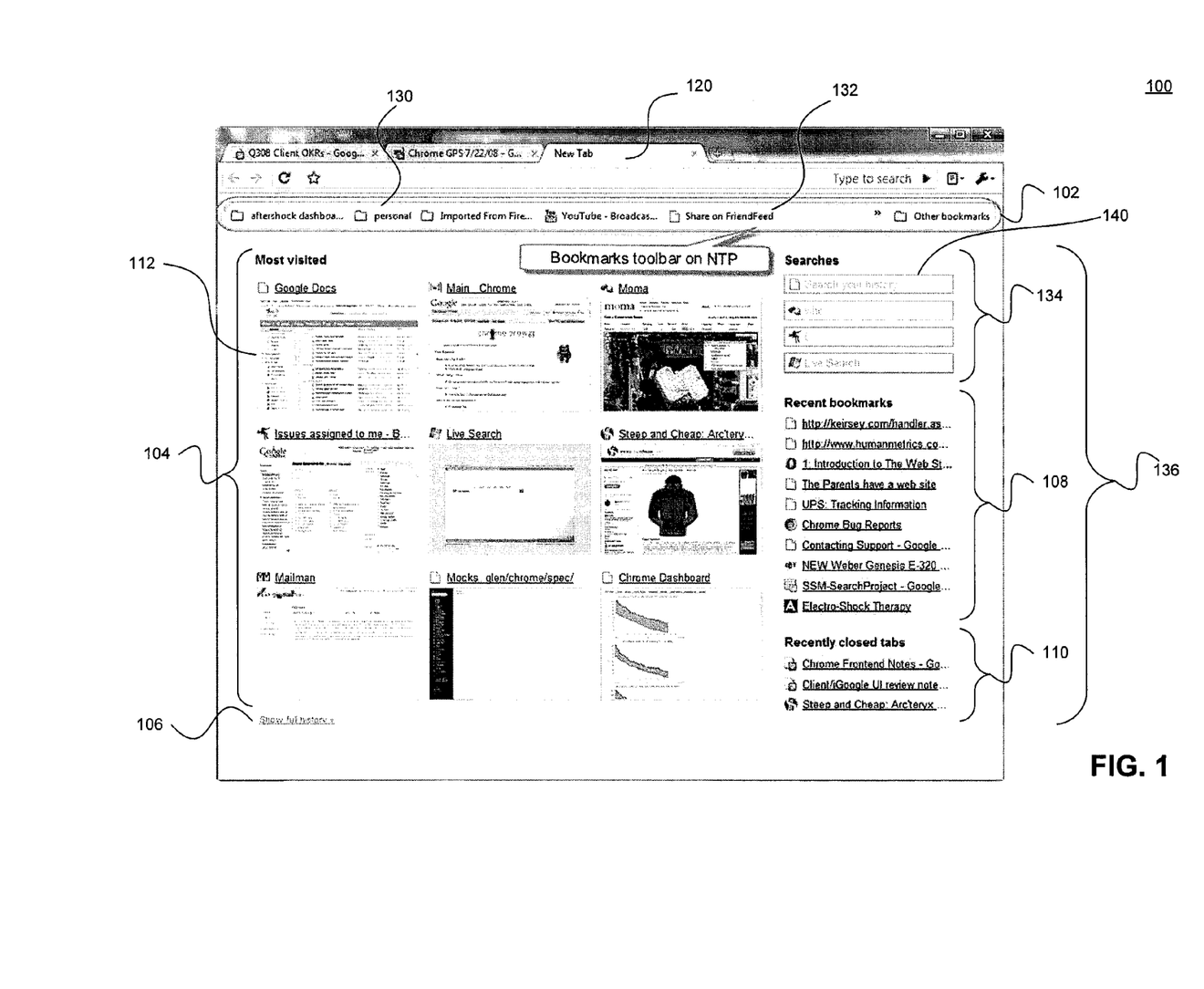
FIG. 1 is a diagram with a screenshot of a new tab in a browser according to an embodiment.

FIG. 1 displays a diagram 100 that illustrates a screenshot of a browser system. Diagram 100 includes a new tab 120. In an example, the browser system may open new tab 120 in response to a user pressing a keyboard shortcut to open a new tab, such as control-T. In another example, the browser system may open new tab 120 in response to a user selecting a option, such as "New Tab" from a menu, such as the "File" menu, to open a new tab. New tab 120 may also be displayed when the user opens a new window or as a homepage when a browser system starts up. These examples are merely illustrative.

New tab 120 includes a bookmarks toolbar 102. In an embodiment, a browser system displays bookmarks toolbar 102 when a user takes an action to navigate to a new page. One example of an action to navigate to a new page is opening a new tab as shown in diagram 100. When the user navigates to a page in new tab 120, bookmarks toolbar 102 may disappear saving valuable screen space.

New tab 120 includes a content area 136. When the browser navigates to a page, the page is rendered and displayed in content area 136. However, before a user navigates to a page, content area 136 displays a new tab page as shown in FIG. 1.

The new tab page of new tab 120 includes a panel 104 showing a set of frequently visited sites. Each of the frequently visited sites is represented by a thumbnail image of a representative page from the site, such as a thumbnail 112 of a GOOGLE DOCS site. When a user selects a thumbnail image for a site, the user may be directed to the site. How the sites are selected for display in panel 104 and how the thumbnail for each site is determined are described in detail below. Users have a tendency to frequent a handful of pages on a regular basis. By displaying the user's most frequently visited sites when the user opens a new tab, a browser system enables the user to navigate quickly and easily to those sites. Ultimately, displaying the user's most frequently visited sites in panel 104 results in an improved user experience.

As discussed above, panel 104 displays a handful of frequently visited sites in the new tab page. The new tab page also has a link 106 that, when selected, causes the browser to display a full history of visited sites in tab 120. The history of visited sites may be displayed as a list or as a set of thumbnail images. The history of visited sites may be ordered by how recently the site was viewed, how frequently the site was viewed, or some combination of both.

The new tab page also includes a panel 134 that provides the user search options. Panel 134 may include a field 140 that enables a user to search only the sites or pages in the user's history. For example, when a user enters a search string in field 140, a browser system may search the sites or pages in the user's history. This enables a user to easily locate a previously visited site.

In addition to field 140, panel 134 may include fields to search using a variety of search engines. Panel 134 may include fields to search recently or frequently used search engines. Alternatively, panel 132 may display fields to search popular search engines such as a GOOGLE search engine.

The new tab page also includes a panel 108 displaying recently used bookmarks. Each bookmark has an associated address of a page. Panel 110 includes a list of links that, when selected, causes the page to be displayed in content area 136.

Often a user would like to navigate to a page that was recently closed. For this reason, the new tab page may include a panel 110 with links to pages of recently closed tabs. In an example, each time a user closes a tab, an address of the page displayed in the closed tab is stored. The stored addresses are used in links in panel 110. Panel 110 includes a list of links that, when selected, causes the page at the stored address to be retrieved and displayed in content area 136.

The new tab page may also display links to recommended sites. Recommended sites may be determined by, for example, evaluating the user's history and determining sites that the user may like based on the user's history.

Figure 2:
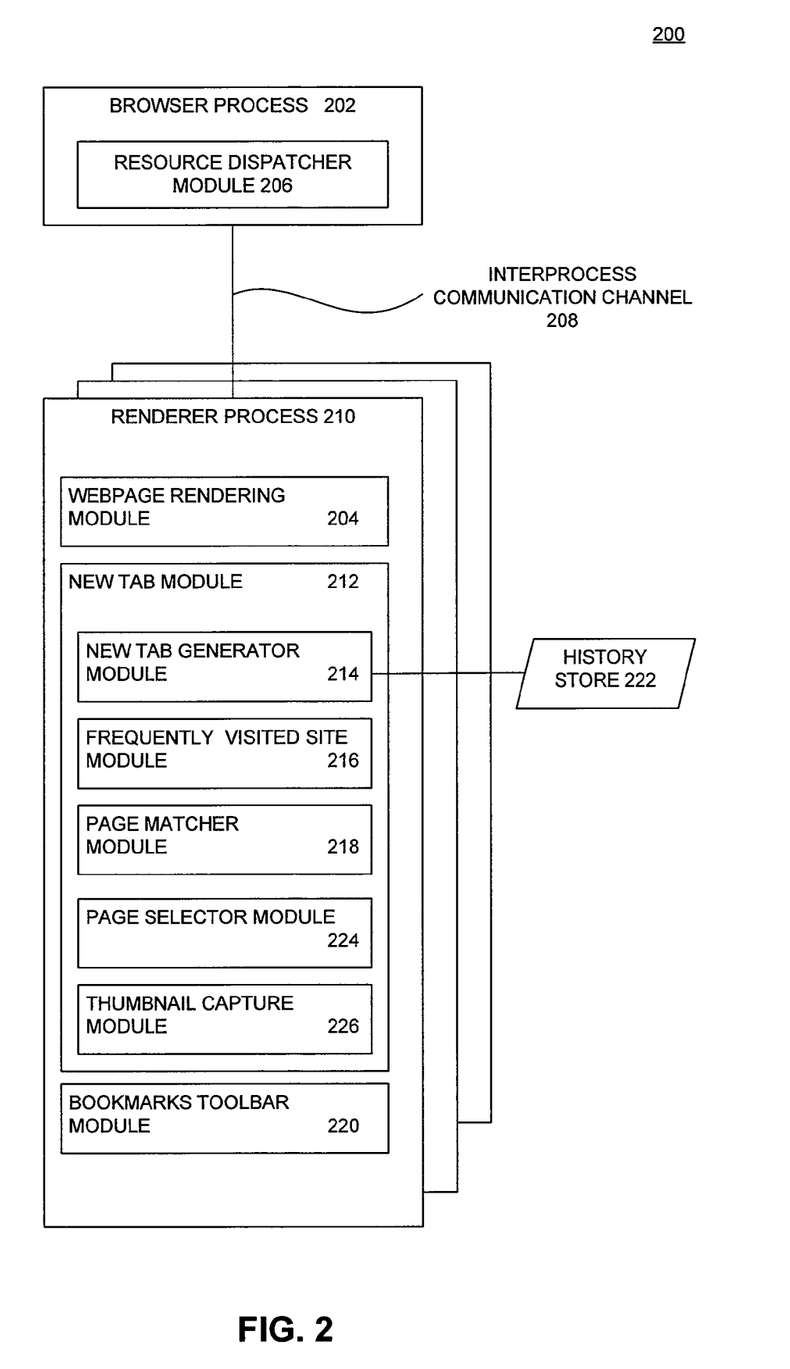
FIG. 2 is a diagram illustrating a browser system that enables a user to navigate to a new page according to an embodiment.

FIG. 2 is a diagram illustrating a browser system 200 that enables a user to navigate to a new page according to an embodiment. Browser system 200 includes a browser process 202 and renderer process 210. Browser process 202 retrieves web content and communicates with renderer process 210 to render the web content. Although browser process 202 and renderer process 210 are illustrated in separate processes it would be understood by those skilled in the art that they can be combined into a single process. Further, there may be one or more renderer processes 210. For example, there may be one renderer process 210 for each tab.

Browser process 202 can communicate with one or more web servers (not shown) over one or more networks, such as the Internet, to retrieve content. Browser process 202 can communicate with an input (not shown) to allow a user to input data, to input commands, or to provide other control information to browser process 202. Browser process 202 may control creation and destruction of the various tabs and renderer processes 210. Browser process 202 also may control how the tabs are ordered on the tab bar. Once browser process 202 retrieves web content, browser process 202 may communicate with renderer process 210 to render and display the content in a tab. Browser process 210 may use a resource dispatcher module 206 to communicate with renderer process 210 via inter-process communication channel 208.

Resource dispatcher module 206 packages requests to renderer process 210. Resource dispatcher module 206 may, for example, run on a separate I/O thread in browser process 202. Resource dispatcher module 206 may convert a function call to renderer process 210 into an IPC message. Resource dispatcher module 206 may send the IPC message to renderer process 210 via inter-process communication channel 208. Inter-process communication channel 208 may be any type of inter-process communication including a shared memory or named pipe.

Renderer process 210 includes a webpage rendering module 204. Webpage rendering module 204 may be an application framework that provides some of core functions of browser system 200. For example, webpage rendering module 204 may maintain a data structure representing all or part of the web content displayed to a user on a page. Webpage rendering module 204 may also interpret and render some of the web content. For example, webpage rendering module 204 may parse and render HTML and XML. Webpage rendering module 204 also may execute some scripts embedded in the web content, such as JavaScript. When webpage rendering module 204 encounters plug-in content in the web content, webpage rendering module 204 may call a web plug-in to interpret the plug-in. Webpage rendering module 204 can include, but is not limited to, WebKit available at http://webkit.org/.

Renderer process 210 also includes a new tab module 212 and a bookmarks toolbar module 220. While these modules are located in renderer process 210 in browser system 200, the modules also may be located in browser process 202 or other processes as known to those of skill in the art.

Bookmarks toolbar module 220 displays a new bookmarks toolbar when a user takes an action to navigate to a new page. Bookmarks toolbar module 220 may display a bookmarks toolbar such as bookmarks toolbar 102 in FIG. 1. For example, bookmarks toolbar module 220 may receive a user input to open a new tab. In another example, bookmarks toolbar module 220 may receive a user input in response to a user hovering a pointer, such as a pointer controlled by a mouse, over an address bar. Both of these actions signal a user's intent to navigate to a new page. By only displaying the bookmarks toolbar when a user is trying to navigate to a new page, embodiments of this invention save valuable screen space. Further, embodiments of this invention display bookmarked pages when the user is most likely to want to navigate to those pages.

Bookmarks toolbar module 220 also may display a bookmarks toolbar all the time. For example, a user may set a user preference for the bookmarks toolbar to be always visible. With the user preference set, bookmarks toolbar module 220 may display a bookmarks toolbar continuously—not just when a user takes an action to navigate to a new page.

New tab module 212 causes a new tab, such as new tab 120 in FIG. 1, to be displayed. As in FIG. 1, new tab module 212 generates a new tab page personalized to a user. New tab module 212 may generate a new tab page according to a user's past history. New tab module 212 includes a page matcher module 218, a frequently visited site module 216, a page selector module 224, a thumbnail capture module 226, and a page matcher module 218. New tab module 212 is also coupled to a history store 222.

In general, new tab module 212 may operate as follows. When a user visits a new page, page matcher module 218 determines what site the page belongs to. New tab module 212 updates history store 222 according to the site visit. When the user opens a new tab, most visited page site module 216 determines the most visited sites based on history store 222. For each of the sites, a thumbnail image for the site is determined by page selector module 224 and thumbnail capture module 226. Using the most visited sites determined by frequently visited site module 216, new tab generator module may generate a new tab page with the thumbnail images for the most visited sites. Operation of new tab module 212 and its components is described in more detail below.

Page matcher module 218 determines what site the page belongs to. This operation may be performed whenever browser 200 visits a page. Alternatively, a history of pages may be stored in history store 222 and the pages may be matched up to sites at a different time, such as a by an asynchronous thread or when a new tab is loaded. To determine what site a page belongs to, page matcher module 218 may compare addresses (such as URL addresses) of various pages of the site. In an embodiment, page matcher module 218 may match pages into a site based on a domain name in the address. If several pages have addresses with the same domain name, those pages may be grouped together into a site. Page matcher module 218 may also group pages into sites by looking at the user's history. For example, page matcher module 218 may group pages that the user visited sequentially into a site. In another example, page matcher module 218 may use both the user's history in conjunction with the addresses to group pages into sites. Page matcher module 218 may store the page visited, a thumbnail image of the page, and the site of the page into history store 222. Operation of page matcher module 218 is described in more detail in FIG. 3.

History store 222 may store each page visited along with thumbnails for each page. Alternatively, history store 222 may only store a single thumbnail for each site. In that case, before the thumbnail of a page is captured and stored, page selector module 224 must determine whether the page is the page to represent a site.

Page selector module 224 determines a page to represent a site. Page selector module 224 may select a representative page from the pages of the site. In an embodiment, each time a user visits a page selector module 224 may determine if the page is better then the currently stored representative page for the site. Page selector module 224 may select a representative page based on the filesize of the page, the color of the page, the number of times a user interacts with a page, and the length of time the user spends viewing the page. Page selector module 224 may determine a score based on any or all of these factors. If the score exceeds a best score for the site, then a new page is selected for the site. A thumbnail for the new page may be used on a new tab to represent the site. If a thumbnail image for the page has not already been captured, thumbnail capture module 226 may capture a new thumbnail for the site.

To capture the thumbnail image, thumbnail capture module 226 may take a screenshot of the top of the page. Often, the top of the page includes banner ads, so thumbnail capture module 226 may take a screenshot of an area slightly below the top of the page. Sometimes, different portions of the page load at different times. So, thumbnail capture module 226 may wait for a specified time before taking a screenshot. Alternatively, thumbnail capture module 226 may wait for all the elements of the page to load before taking a screenshot. Once thumbnail capture module 226 takes the screenshot, thumbnail capture module 226 may reduce the resolution of the screenshot to generate a thumbnail image.

History store 222 stores the user's history. History store 222 may store a thumbnail image of each page visited. Alternatively, history store 222 may only store a thumbnail image for each site. History store 222 may be stored in persistent or non-persistent memory. In examples, history store 222 may be a flat file or a combination of flat files. History store 222 may be a database such as a MYSQL database, available from http://www.mysql.com/, or an SQLITE database, available from http://sqlite.org/. History store 222 may be a separate store to support the creation of the new tab page. History store 222 also may be combined with a browser cache, address history list, link coloring database or other history store used in browser systems. History store 222 may also be stored in a separate server, remote from a user's client machine. These examples are merely illustrative.

As mentioned earlier, when user opens a new tab generator module 214 generates a new tab page, such as the new tab shown in FIG. 1. In an example, new tab generator module 214 may render a new tab page. Alternatively, new tab generator module 214 may generate data, such as an HTML file, representing a new tab page that is then rendered by another component, such as webpage rendering module 204.

The new tab may have a panel showing frequently visited sites. The frequently visited sites are determined by frequently visited site module 216. Frequently visited site module 216 may determine the frequently visited site based on the frequency that a user has visited a site, how recently the user has visited the site, or a combination of both. Frequently visited site module 216 may discount the time elapsed since the user has visited the site by the amount of time since the user has last used browser system 200. Using the frequently visited sites determined by frequently visited site module 216, new tab generator module 214 may generate a panel in the new tab.

New tab generator module 214 also may generate other panels. For example, new tab generator module 214 may generate a panel that includes search fields, such as panel 134 in FIG. 1, a panel that includes recently used bookmarks, such as panel 108, and a panel that show recently closed tabs, such as panel 110.

Browser system 200 may be implemented on any computing device that can support browsing. Such a computing device may include, but is not limited to, a computing device having a processor and memory for executing and storing instructions. Such a device may include software, firmware, and hardware. Software may include one or more applications and an operating system. Hardware can include, but is not limited to, a processor, memory and user interface display. Optional input devices, such as a mouse, a touch sensitive screen, or any future developed interaction method may be used. Example computing devices that can support web browsing include but are not limited to a computer, workstation, mobile device, set-top box, or cluster of computers.

Each of resource dispatcher module 206, webpage rendering module 204, new tab module 212, new tab generator module 216, frequently visited site module 216, page matcher module 218, page selector module 224, thumbnail capture module 226 and bookmarks toolbar 220 may be implemented on hardware, software, firmware, or any combination thereof.

Figure 3:
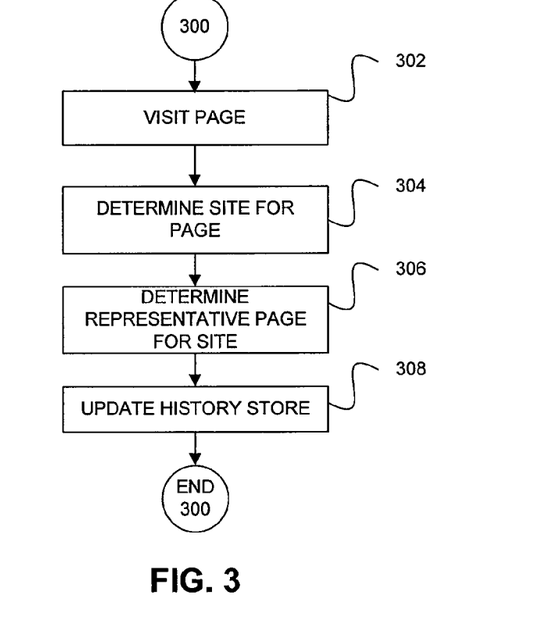
FIG. 3 is a flowchart illustrating a method for updating a history store according to an embodiment.

FIG. 3 is a flowchart illustrating a method 300 for updating a history store according to an embodiment. In an embodiment, method 300 may be used in operation of browser system 200 of FIG. 2. Although some of the steps of method 300 are described with respect to a browser system, it should be recognized that method 300 may be used in other contexts are known to those of skill in the art.

Method 300 begins by visiting a page at step 302. A browser may visit a page in response to a user request. For example, a user may select a link or a bookmark that directs the browser to a new page. In another example, a user may enter an address that directs the browser to a new page. Also, the browser may load the new page at startup if, for example, the page is a homepage.

A browser system may visit a page at step 302 by, for example, sending an HTTP request to a web server identified in an address of the page. The web server may send back to the browser system an HTTP response. The HTTP response may include at least a portion of the page.

A site for the page is determined at step 304. As mentioned earlier, a site is a collection of related pages. To determine the site that a page belongs to, a browser system may compare the URL patterns of the pages. In one embodiment, a browser system may determine that two pages are the same site if the URLs have the same domain name. For example, a page with the address "http://en.wikipedia.org/wiki/Main_Page" and a page with the address "http://en.wikipedia.org/wiki/Portal:Arts" may be matched to the same site because they have the same domain name "en.wikipedia.org". In another embodiment, two pages may be matched to the same site if a portion of their domain names, such as the first and second levels, match. For example, a page with the address "http://en.wikipedia.org/wiki/Main_Page" and a page with the address "http://de.wikipedia.org/wiki/Portal:Kunst_und_Kultur" may be matched to the same site because their domain names have the same top two levels "wikipedia.org".

While domain name matching has advantages, sometimes related pages have different domain names. To deal with this, pages may be grouped into sites based on the user's history as well. In an embodiment, when a first page automatically redirects to a second page, the two pages may be in the same site. For example, a page addressed by a site "http://mail.google.com" may automatically redirect a user to a page "https://www.google.com/accounts/" to sign in. Because one page automatically redirects to another, the pages may be grouped in the same site. Further, when a user navigates from one page to another by selecting a link or other navigational button, the two pages may belong to the same site, or the two pages may have a greater likelihood of being matched to the same site. For example, a user may transition from a page with an address "https://www.google.com/accounts/" to a page with another address "http://mail.google.com/mail/" by selecting a submit button. In this case, the two pages may be grouped into the same site. In an example, login pages, perhaps identified with a password manager or a password field in the page, may be treated as a redirect page as well.

In an embodiment, the pages may be matched using a combination of URL pattern matching and browsing history. For example, pages with the same domain name may always be grouped into the same site, whereas pages with different, but similar, domain names may be grouped only if the pages are adjacent in the user's history.

At step 306, a representative page for the site is determined. As mentioned earlier, step 306 may occur whenever a user visits a page. In that case, when a user visits a page, the page is compared against the current representative page for the site. If the page is better then the representative page, then the page becomes the new representative page. Step 306 may also occur when a new tab is instantiated or asynchronously, for example, in a background thread.

To determine the representative page for a site, a browser system may look to, for example, the filesize of the pages, the color of the pages, the number of times the user interacts with a page, and the amount of time a user spends viewing the page. These factors may be used together, for example, to get an aggregate score. Once the browser system determines the representative page, the browser may take a screenshot of the page. The browser system may reduce the resolution of the screenshot to determine a thumbnail image to represent the site.

Pages with more content are often more relevant than pages without as much content. For this reason, the relative file size of the page may be used as an indicator of whether to use the page as the representative page.

Browsers are often temporarily redirected between pages that appear blank. In examples, a blank page may collect information (such as click-through statistics), may redirect the browser to other pages or may include scripts that instruct the browser to perform some function. A blank page may not be useful as a representative page for a site. For this reason, the browser system may look to the color of a page to determine whether to use the page to represent a site. In an example, the more color a page has, the more likely the browser will use it as a representative page.

Also, the number of times the user interacts with a page, and the amount of time a user spends viewing the page relates to how relevant a page is. For example, a page that a user visits frequently and spends a lot of time viewing is probably more relevant than a page that the user views briefly and infrequently.

Once the representative page and thumbnail image for the site are determined, they may be stored in a history store at step 308. Also, statistics about the site may be stored in the history store. For example, data recording how frequently a site is visited or how recently the site was visited may be updated. This stored information may later be recalled with a new tab is generated and displayed.

Figure 4:
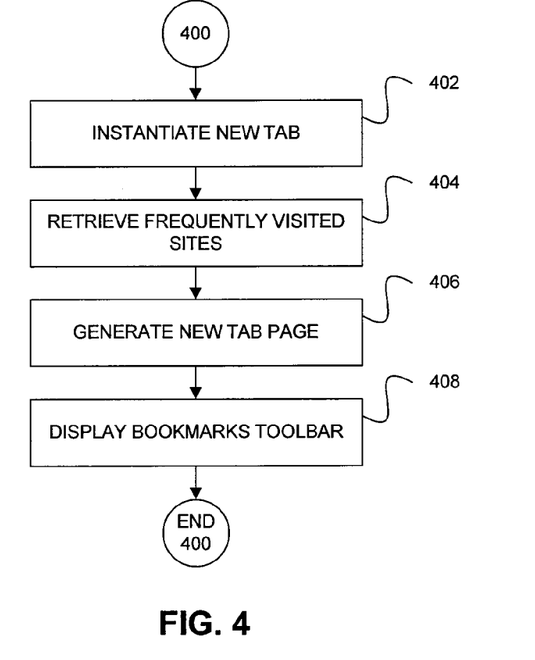
FIG. 4 is a flowchart illustrating a method for displaying a new tab according to an embodiment.

FIG. 4 is a flowchart illustrating a method 400 for displaying a new tab according to an embodiment. Method 400 may be used in operation of a browser system, such as a browser system 200 in FIG. 2, when a new tab is created. A new tab may be created, for example, in response to a user input such a keyboard shortcut or a selection from a menu bar.

Method 400 starts at step 402 when a new tab is instantiated. To instantiate a new tab, a browser system may create a new tab on a tab menu bar. Some browser systems, such as browser system 200 in FIG. 2, may instantiate a new renderer process each time a new tab is displayed.

At step 404, a browser system may retrieve the frequently visited sites. In an embodiment, the browser system may retrieve the frequently visited sites from, for example, a history store. In an alternative embodiment, the browser system may retrieve the sites by a user from a history store and may determine which sites are frequently visited based on the data from the history store. For example, the browser system may look to the number of times a user has visited a site and how recently the user has visited the site. The browser system may discount the time since the user has visited the site when the user has not used the browser system for a period of time.

In an embodiment, if a number of visits occur on the same day, the visits may be discounted. For example, a logarithmic function may be applied to the number of visits for each day. That way, the determined site may not be skewed when a user visits a site a large number of times in a single day. In another embodiment, sites visited automatically may not be weighed as highly as sites visited in response to a user input, e.g., by typing in an address.

At step 406, a browser system may generate a new tab page. The new tab page may include a panel showing thumbnails with the most visited sites. The new tab page also may include panels with suggested search files, recent bookmarks and other data. The new tab page is displayed to the user.

As discussed earlier, the bookmarks toolbar may be displayed when a user takes an action to navigate to a new page. One such action is opening a new tab. So, the bookmarks toolbar may be displayed when creating the new tab at step 408.

Figure 5:
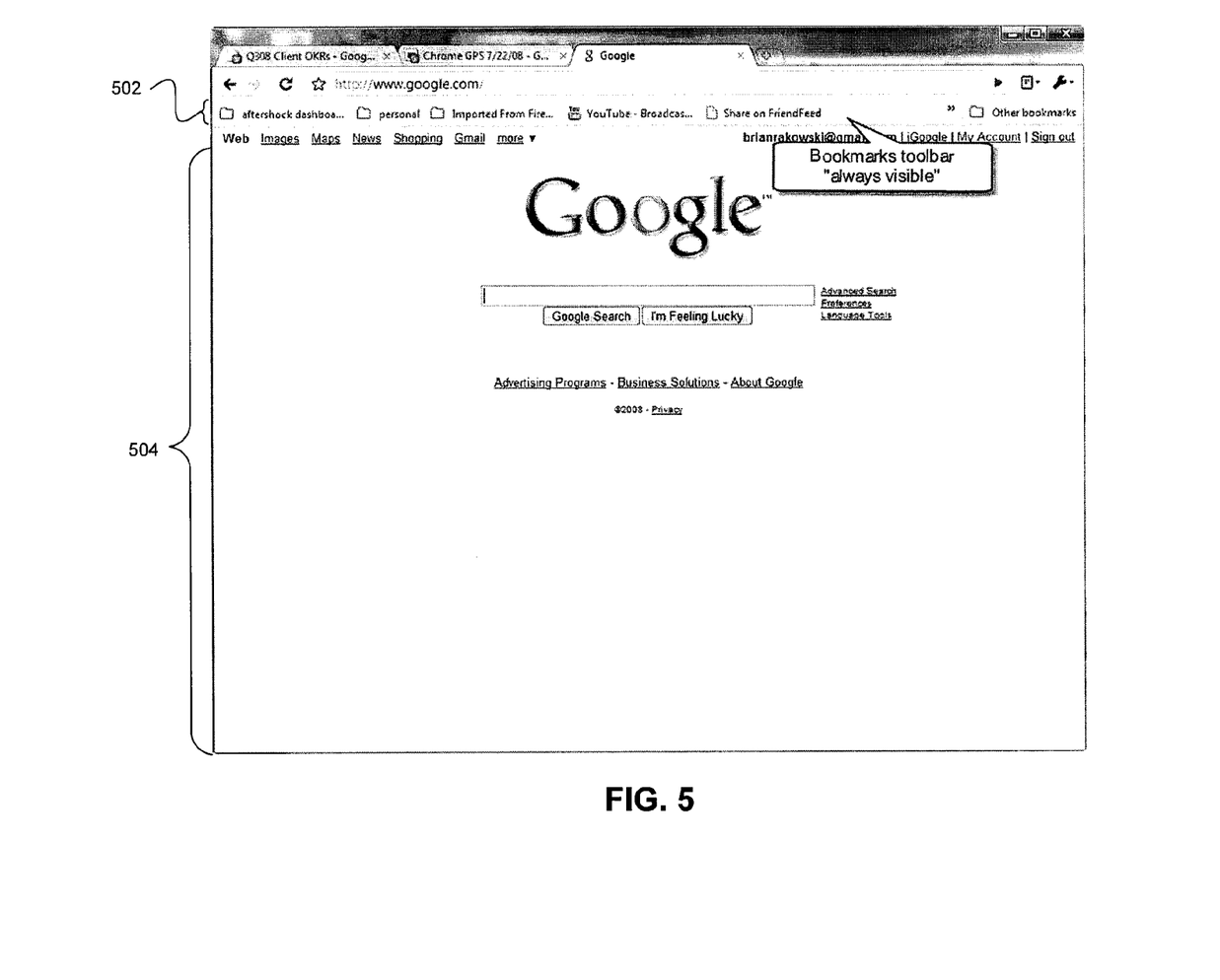
FIG. 5 is a diagram with screenshot showing a bookmarks toolbar.

FIG. 5 is a diagram 500 showing a screenshot with a bookmarks toolbar. Diagram 500 shows a bookmarks toolbar 502 and a search page. As mentioned earlier, the bookmarks toolbar 502 may be displayed only when a user navigates to a new page. Alternatively, bookmarks toolbar 502 may be always visible according to, for example, a user setting as shown in FIG. 5. Bookmarks toolbar 502 also may be displayed in response to a user hovering a pointer over a portion of a user interface display, such as an address field.

Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
generating an instance of a browser running on a computing device, the browser including a tabbed interface with multiple tabs associated with a first user;
receiving, on the computing device, a first user input to open a new tab in the tabbed interface of the browser running on the computing device, wherein the new tab includes a content area positioned at a first location of the tabbed interface, the content area utilized to display a site requested by the first user;
in response to receipt of the first user input, displaying an entire toolbar positioned at a second location of the tabbed interface different from the first location, the entire toolbar comprising at least navigational buttons that are associated with bookmarked pages;
receiving, on the computing device, a second user input to navigate to a new site within the new tab; and
in response to the second user input, removing, from the second location of the tabbed interface, the entire toolbar and the navigational buttons that are associated with the bookmarked pages, such that the new site is displayed in the content area of the new tab positioned at the first location of the tabbed interface.

2. The method of claim 1, wherein the entire toolbar and the navigational buttons associated with the bookmarked pages are only displayed in response to receiving the first user input.

3. The method of claim 1, wherein the displaying the entire toolbar includes displaying the entire toolbar and the navigational buttons associated with the bookmarked pages based on a preference setting selected by a user.

4. The method of claim 1, further comprising:
in response to the first user input to open a new tab, generating a new tab page that is customized for the user based on at least the user's past viewing history; and
displaying on the new tab page, thumbnails for a plurality of representative sites, wherein each representative site is selected based on an aggregate score associated with characteristics of the representative site and characteristics of the user's past viewing history.

5. The method of claim 4, wherein the characteristics of the representative site include at least a size of storage space required for pages associated with the representative site and a number of colors that are displayed on pages associated with the representative site.

6. A system comprising:
a computing device configured to generate an instance of a browser running, the browser including a tabbed interface with multiple tabs associated with a first user; and
a bookmarks toolbar module implemented on the computing device and configured to:

receive a first user input to open a new tab in the tabbed interface of the browser running on the computing device, wherein the new tab includes a content area positioned at a first location of the tabbed interface, the content area utilized to display a site requested by the first user, in response to receipt of the first user input, display an entire toolbar positioned at a second location of the tabbed interface different from the first location, the entire toolbar comprising at least navigational buttons that are associated with bookmarked pages, (iii) receive a second user input to navigate to a new site within the new tab, and (iv) in response to the second user input, remove, from the second location of the tabbed interface, the entire toolbar and the navigational buttons associated with the bookmarked pages, such that the new site is displayed in the content area of the new tab positioned at the first location of the tabbed interface.

7. The system of claim 6, wherein the entire toolbar and the navigational buttons associated with the bookmarked pages are only displayed in response to the user input.

8. The system of claim 6, wherein the bookmarks toolbar module is further configured to display the entire toolbar and the navigational buttons associated with the bookmarked pages based on a preference setting selected by a user.

9. The system of claim 6, wherein the system further comprises:

a new tab module configured to:

in response to the first user input to open a new tab, generate a new tab page that is customized for the user based on at least the user's past viewing history; and display on the new tab page, thumbnails for a plurality of representative sites, wherein each representative site is selected based on an aggregate score associated with characteristics of the representative site and characteristics of the user's past viewing history.

10. The system of claim 9, wherein the characteristics of the representative site include at least a size of storage space required for pages associated with the representative site and a number of colors that are displayed on pages associated with the representative site.

11. The system of claim 9, wherein the characteristics of the user's past viewing history include at least a number of times a user interacts with pages associated with the representative site, and a length of time the user spends viewing pages associated with the representative site.

12. A computer program product having control logic stored therein, said control logic for causing a computer to manage notifications of changes to settings of an application, said control logic comprising:

a first computer readable program code that causes the computer to generate an instance of a browser running on the computer, the browser including a tabbed interface with multiple tabs associated with a first user:

a second computer readable program code that causes the computer to receive a first user input to open a new tab in the tabbed interface of the browser running on the computing device, wherein the new tab includes a content area positioned at a first location of the tabbed interface, the content area utilized to display a site requested by the first user;

a third computer readable program code that, in response to receipt of the first user input, causes the computer to display an entire toolbar positioned at a second location of the tabbed interface different from the first location, the entire toolbar comprising at least navigational buttons that are associated with bookmarked pages;

a fourth computer readable program code that causes the computer to receive a second user input to navigate to a new site within the new tab; and a fifth computer readable program code that, in response to the second user input, causes the computer to remove, from the second location of the tabbed interface, the entire toolbar and the navigational buttons associated with the bookmarked pages, such that the new site is displayed in the content area of the new tab positioned at the first location of the tabbed interface.

13. The computer program product of claim 12, wherein the entire toolbar and the navigational buttons associated with the bookmarked pages are only displayed in response to the first user input.

14. The computer program product of claim 12, wherein the entire toolbar and the navigational buttons associated with the bookmarked pages are displayed based on a preference setting selected by a user.

15. The computer program product of claim 12, further comprising:

a sixth computer readable program code that, in response to the first user input to open a new tab, causes the computer to generate a new tab page that is customized for the user based on at least the user's past viewing history; and a seventh computer readable program code that causes the computer to display on the new tab page, thumbnails for a plurality of representative sites, wherein each representative site is selected based on an aggregate score associated with characteristics of the representative site and characteristics of the user's past viewing history.

16. The computer program product of claim 15, wherein the characteristics of the representative site include at least a size of storage space required for pages associated with the representative site and a number of colors that are displayed on pages associated with the representative site.

17. The computer program product of claim 15, wherein the characteristics of the user's past viewing history include at least a number of times a user interacts with pages associated with the representative site, and a length of time the user spends viewing pages associated with the representative site.

18. A method for displaying an entire bookmarks toolbar on a computing device, comprising:

generating an instance of a browser running on the computing device, the browser including a tabbed interface with multiple tabs associated with a first user;

receiving, on the computing device, a first user input indicating a user is hovering a pointer over an address bar, wherein the address bar is positioned at a first location of the tabbed interface and includes at least an address field;

in response to receipt of the first user input, displaying the entire toolbar positioned at a second location of the tabbed interface different from the first location, the entire toolbar comprising at least navigational buttons that are associated with bookmarked pages;

receiving, on the computing device, a second user input to navigate to a new site; and in response to the second user, removing, from the second location of the tabbed interface, the entire toolbar and the navigational buttons associated with the bookmarked pages, such that the new site is displayed in the content area of a new tab positioned at a third location of the tabbed interface.

19. The method of claim 18, wherein the characteristics of the user's past viewing history include at least a number of times a user interacts with pages associated with the representative site, and a length of time the user spends viewing pages associated with the representative site.

\* \* \* \* \*